US010836360B2

(12) United States Patent
Lopez et al.

(10) Patent No.: US 10,836,360 B2
(45) Date of Patent: Nov. 17, 2020

(54) WINDSCREEN WIPER DEVICE

(71) Applicant: Federal-Mogul Motorparts LLC, Southfield, MI (US)

(72) Inventors: David Reyes Lopez, Chihuahua (MX); Miguel Angel Gallegos, Cd. Juarez (MX); Esteban Figueroa Ortiz, Cd. Juarez (MX); Miguel Gutierrez, Cd. Juarez (MX); Jesus Yee, El Paso, TX (US)

(73) Assignee: Trico Products Corporation, Rochester Hills, MI (US)

( * ) Notice: Subject to any disclaimer, the term of this patent is extended or adjusted under 35 U.S.C. 154(b) by 196 days.

(21) Appl. No.: 16/178,994

(22) Filed: Nov. 2, 2018

(65) Prior Publication Data

US 2019/0135235 A1   May 9, 2019

Related U.S. Application Data

(60) Provisional application No. 62/581,458, filed on Nov. 3, 2017.

(51) Int. Cl.
*B60S 1/40* (2006.01)

(52) U.S. Cl.
CPC .............. *B60S 1/40* (2013.01); *B60S 1/4045* (2013.01); *B60S 1/4048* (2013.01); *B60S 1/4003* (2013.01);
(Continued)

(58) Field of Classification Search
CPC ........ B60S 1/40; B60S 1/4038; B60S 1/4045; B60S 1/4048; B60S 1/4003;
(Continued)

(56) References Cited

U.S. PATENT DOCUMENTS

2015/0013093 A1   1/2015   Polocoser et al.
2016/0264101 A1*  9/2016   Ohta ..................... B60S 1/4048
(Continued)

FOREIGN PATENT DOCUMENTS

EP   3112223 A1   1/2017
EP   3118070 A1   11/2018
WO   WO2013/030130 A1 *  3/2013

OTHER PUBLICATIONS

International Search Report, dated Feb. 20, 2019 (PCT/US2018/059105).

*Primary Examiner* — Gary K. Graham
(74) *Attorney, Agent, or Firm* — Miller Canfield

(57) ABSTRACT

The windscreen wiper device includes a wiper element and a carrier element. A base of a connecting device is fixedly attached with the carrier element, and a joint part is pivotably attached with the base. The joint part has a top wall and a pair of side walls and a button configuration for locking attachment with different types of oscillating arms. The button configuration includes a first button and a pair of resilient strips that extend from the side walls to the first button and bias the first button into a raised position. The resilient strips also allow the first button to move to a pressed position. A second button is attached with the first button, and the second button is pivotable about a living hinge from a first position, wherein the second button projects above the top wall, to a second position wherein the second button is recessed.

12 Claims, 6 Drawing Sheets

(52) U.S. Cl.
CPC .. *B60S 2001/409* (2013.01); *B60S 2001/4051* (2013.01); *B60S 2001/4054* (2013.01)

(58) Field of Classification Search
CPC ...... B60S 2001/4051; B60S 2001/4054; B60S 2001/409
USPC ..................................................... 15/250.32
See application file for complete search history.

(56) References Cited

U.S. PATENT DOCUMENTS

| | | |
|---|---|---|
| 2016/0375869 A1 | 12/2016 | Gaucher et al. |
| 2017/0015281 A1 | 1/2017 | Mouleyre et al. |
| 2020/0023813 A1* | 1/2020 | Shimizu ................ B60S 1/4048 |

* cited by examiner

WINDSCREEN WIPER DEVICE

CROSS REFERENCE TO RELATED APPLICATIONS

This U.S. Patent Applications claims the benefit of U.S. Provisional Patent Application Ser. No. 62/581,458 filed Nov. 3, 2017 entitled "Windscreen Wiper Device," the entire disclosure of the application being considered part of the disclosure of this application and hereby incorporated by reference.

BACKGROUND OF THE INVENTION

1. Field of the Invention

The present invention is related generally to windscreen wiper devices and, more particularly, to a connector device for a windscreen wiper device.

2. Related Art

Vehicles are assembled with a permanent oscillating arm, which is designed to last for the life of the vehicle, and a windscreen wiper device that is designed to be detached from the oscillating arm and replaced when worn. Since the oscillating arm is permanent, when a customer needs to replace their windshield wiper device with an aftermarket device, they must select one that is designed to accommodate their oscillating arm. Thus, aftermarket windscreen wiper devices must supply windscreen wiper devices that are capable of attachment with these various different types of oscillating arms. Thus, there is a continuing desire for windscreen wiper device connectors that are designed to accommodate, in a reliable and secure manner, multiple different types of oscillating arms. It is further a desire that such connectors be both easy and intuitive for a customer to attach with and detach from the oscillating arm.

SUMMARY OF THE INVENTION AND ADVANTAGES

One aspect of the present invention is related to a windscreen wiper device which includes a wiper element that is made of an elastomeric material and at least one carrier element that operably supports the wiper element. The windscreen wiper device also includes a connecting device, which includes a base and a joint part. The base is fixedly attached with the at least one carrier element, and the joint part is pivotably attached with the base about a pivot axis. The joint part has a top wall that extends in a lateral direction between a pair of side walls. The joint part further includes a button configuration for lockingly attaching the connecting device with at least two different types of oscillating wiper arms. The button configuration includes a first button and a pair of resilient strips that extend from the side walls to the first button and bias the first button into a raised position with the first button projecting above the top wall. The resilient strips also allow the first button to move to a pressed position wherein a top surface of the first button is generally flush with the top wall. The button configuration also includes a second button that is attached with the first button via a living hinge, and the second button is pivotable about the living hinge from a first position wherein the second button projects above the top wall to a second position wherein the second button is recessed below the first button.

The joint part advantageously is able to attach with and detach from at least two different types of bayonet-style oscillating arms in a very simple and intuitive manner. That is, connecting either type of bayonet-style oscillating arm with the joint part involves simply sliding the oscillating arm onto the joint part until either the first button or the second button snaps into a respective opening. Detachment involves simply pressing the respective button downwardly and sliding the oscillating arm off of the joint part. The joint part may also be made as a monolithic piece of injection molded plastic, which offers substantial cost savings as compared to other known joint parts which require multiple pieces to attach with different styles of oscillating wiper arms.

According to another aspect of the present invention, when the first button is in the raised position and the second button is in the first position, the second button projects above the first button.

According to yet another aspect of the present invention, each of the resilient strips is fixedly attached with a respective one of the side walls at a location which is spaced below the top wall.

According to still another aspect of the present invention, each of the first and second buttons has a ramped surface which faces in a longitudinal direction away from the pivot axis.

According to a further aspect of the present invention, in the longitudinal direction, the second button is located between the first button and the pivot axis.

According to yet a further aspect of the present invention, the top wall of the joint part has a window, and the first and second buttons are located in the window.

According to still a further aspect of the present invention, the joint part includes a main body portion and a front nose portion that is positioned at one longitudinal end of the main body portion.

According to another aspect of the present invention, the front nose portion has a tongue which overlies the top wall.

According to yet another aspect of the present invention, the front nose portion has a greater width and a greater height than the main body portion.

According to still another aspect of the present invention, the joint part includes spring fingers that protrude laterally outwardly from the side walls.

According to a further aspect of the present invention, the base includes a pair of laterally outwardly extending and co-axially aligned protrusions, and the side walls of the joint part include a pair of circular openings that receive the protrusions to connect the joint part with the base.

According to yet a further aspect of the present invention, the first and second buttons are located in a longitudinal direction closer to one longitudinal end of the joint part than to the circular openings.

BRIEF DESCRIPTION OF THE DRAWINGS

These and other features and advantages of the invention will become more readily appreciated when considered in connection with the following description of the presently preferred embodiments, appended claims and accompanying drawings, in which:

DESCRIPTION OF THE ENABLING EMBODIMENT

Figure 1:
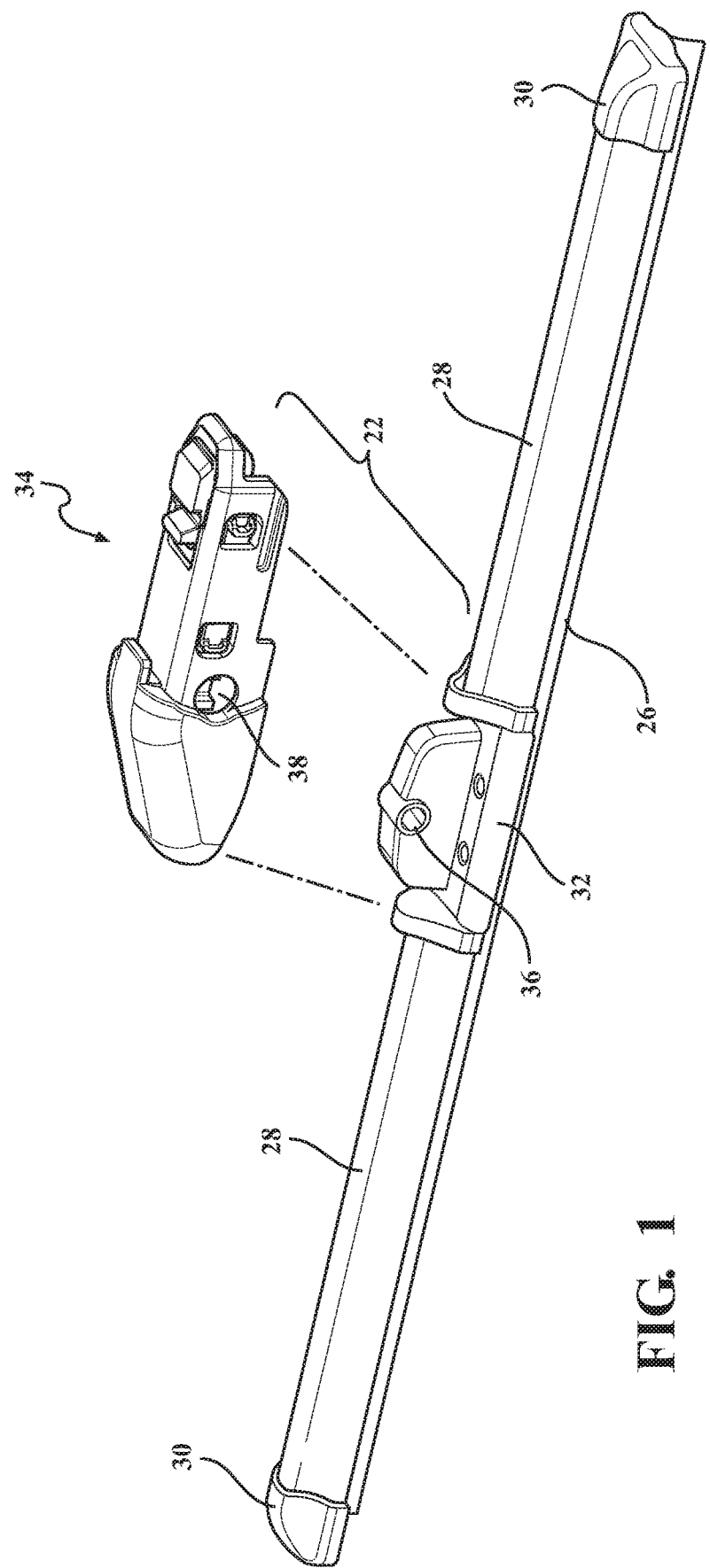
FIG. 1 is a perspective view of a windscreen wiper device a joint part, which is constructed according to one aspect of the present invention, being removed from a base of a connecting device.

Referring to the Figures, wherein like numerals indicate corresponding parts throughout the several views, a windscreen wiper device 20 with an improved connecting device 22 is generally shown in FIG. 1. The improved connecting device 22 is capable of attachment with 17 mm and 19 mm sized bayonet-style oscillating wiper arms 24a, 24b (hereinafter referred to as 17 and 19 mm wiper arms and shown in FIGS. 5 and 8 respectively) without any adapters or extra pieces. The fact that the connecting device 22 can securely and safely attach with each of these wiper arms 24a, 24b allows for manufacturing cost savings through economies of scale and also reduces packaging and stocking costs by reducing the number of different products that a windscreen device manufacturer has to package, offer for sale, and sell.

The windscreen wiper device 20 of the exemplary embodiment has a beam-style construction in that it includes a longitudinally extending carrier element (not shown) which is pre-shaped to bias an elastomeric wiper blade 26 (also known as a wiper strip or a wiping element) into a curved shape. This allows an entire length of the wiper blade 26 to seal against a curved windshield (not shown) of a vehicle as the wiper device 20 oscillates back and forth. That is, in the exemplary windscreen wiper device 20, the carrier element, rather than a series of yokes, distributes a force from the wiper arm 24a, 24b along the length of the wiper blade 26. The windscreen wiper device 20 also includes a pair of sub-spoilers 28, which are may be either made as separate pieces from one another and from the wiper blade 26 or may be made as one monolithic piece with the wiper blade 26. The sub-spoilers 28 are attached with the carrier element and impart a downforce on the wiper blade 26 when the vehicle is travelling at speed to improve the seal between the wiper blade 26 and the windshield. The connecting device 22 is attached with the carrier element and/or the wiper blade 26 at approximately a longitudinal midpoint of the windscreen wiper device 20. A pair of end caps 30 are engaged with opposite ends of the carrier element for retaining the sub-spoilers 28 on the carrier element between the connecting device 22 and the end caps 30. It should be appreciated that the carrier element could include one or more longitudinal strips that are received in one or more longitudinally extending grooves of the wiper blade 26. The one or more grooves could either open laterally outwardly or can be fully enclosed within the wiper blade 26.

The connecting device 22 is of two pieces including a base 32 and a joint part 34. The base is fixedly attached with the carrier element and/or with the wiper blade in a permanent manner. The joint part 34 is pivotably connected with the base 32 by receiving co-axially aligned and circular-shaped protrusions 36 on the base 32 into circular openings 38 in the joint part 34 to allow the joint part 34 to pivot or articulate relative to the base 32 about a pivot axis when attaching the joint part 34 with or detaching the joint part 34 from either of the 17 and 19 mm wiper arms 24a, 24b. The base 32 can be fixedly attached with the carrier element and/or the wiper blade 26 through any suitable means including, for example, ultrasonic welding; heat staking; one or more fasteners; material deformation; etc. The base 32 is preferably made of a single, monolithic piece of metal or plastic and may be shaped through any suitable operation.

Figure 5:
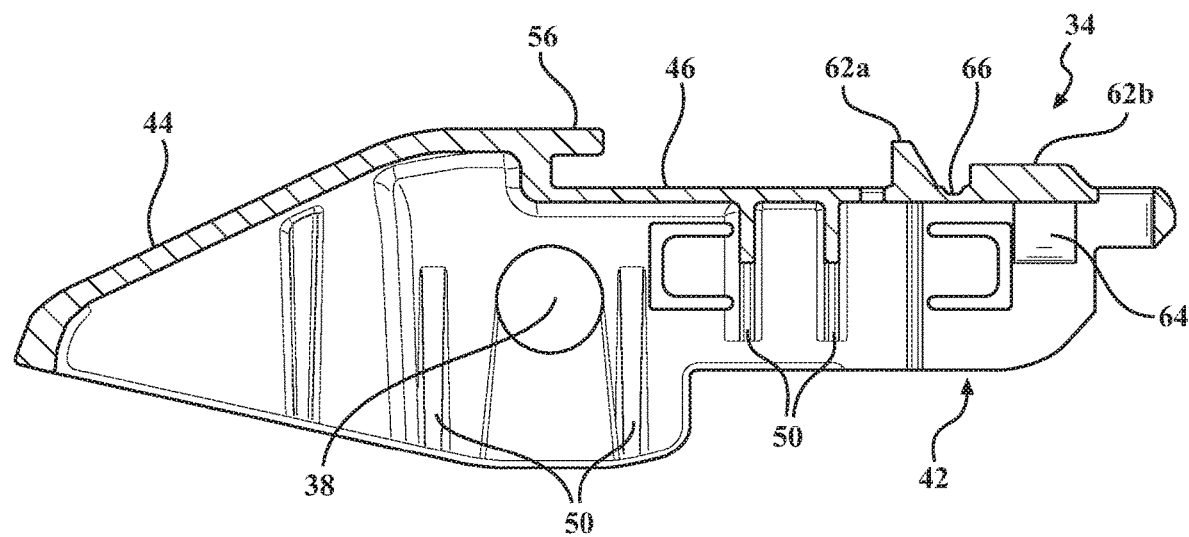
FIG. 5 is a cross-sectional view of the joint part of FIG. 2.
Figure 6:
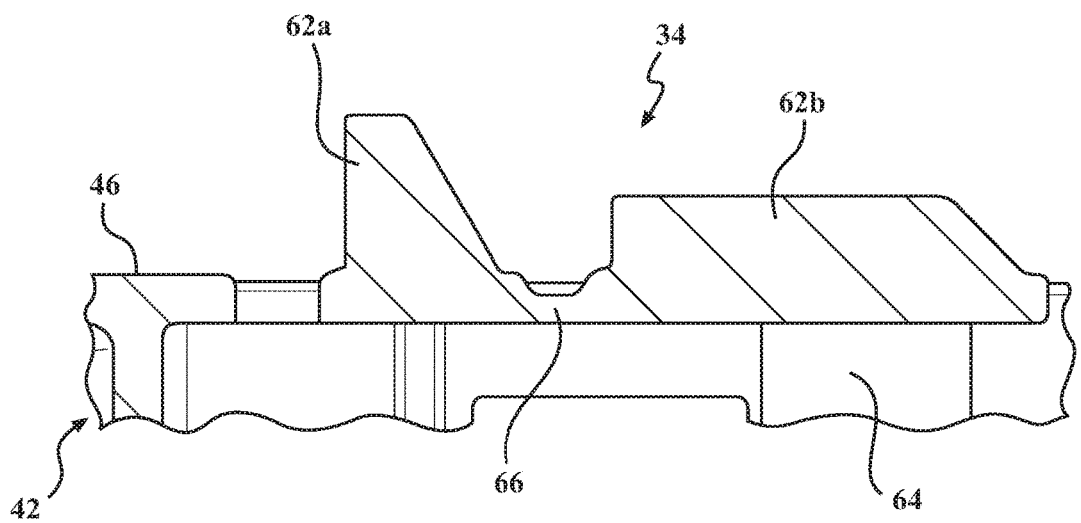
FIG. 6 is an enlarged view of a portion of FIG. 5.
Figure 7:
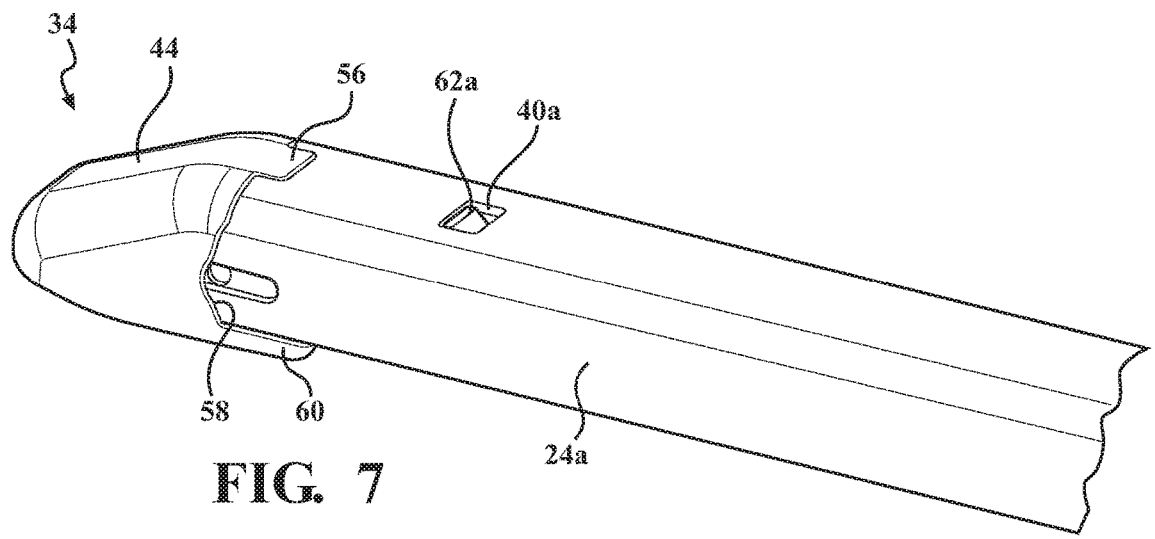
FIG. 7 is a perspective view showing the joint part connected with a 17 mm bayonet style wiper arm.
Figure 8:
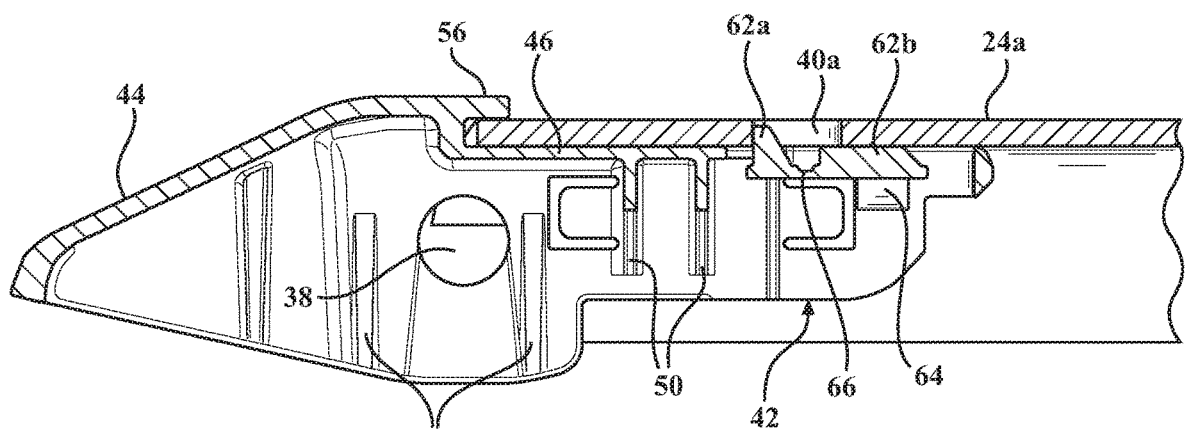
FIG. 8 is a cross-sectional view of FIG. 7.
Figure 9:
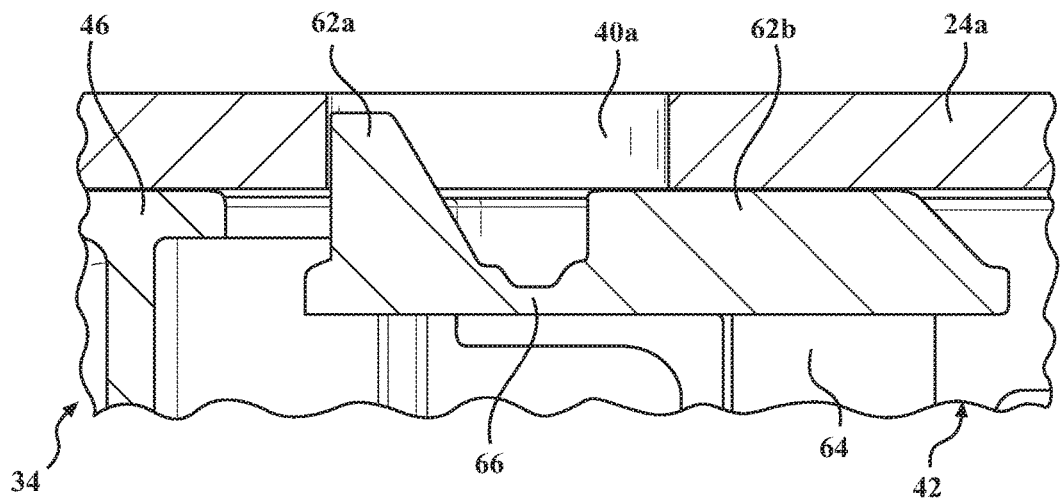
FIG. 9 is an enlarged view of a portion of FIG. 8.
Figure 10:
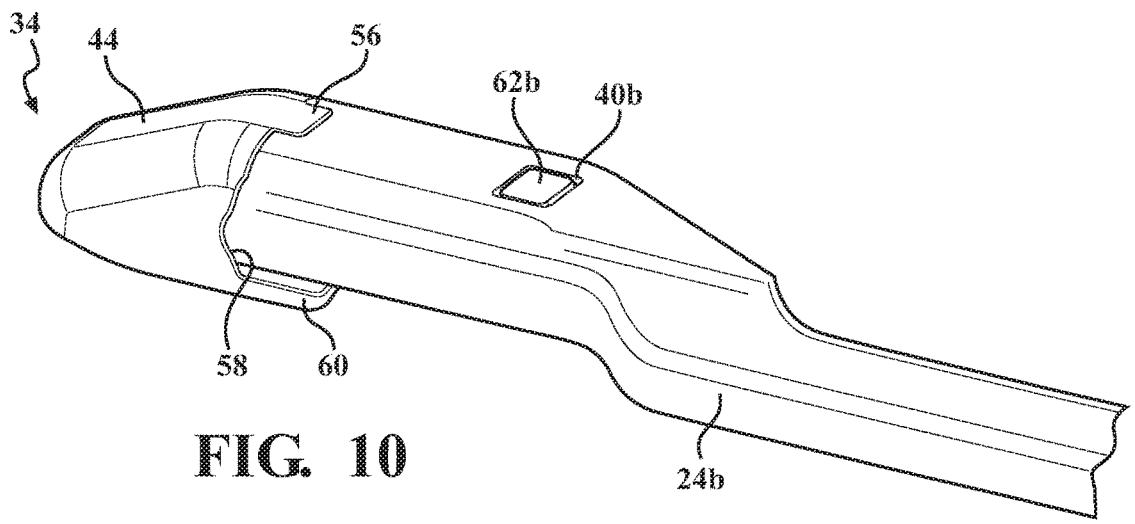
FIG. 10 is a perspective view showing the joint part connected with a 19 mm bayonet style wiper arm.
Figure 11:
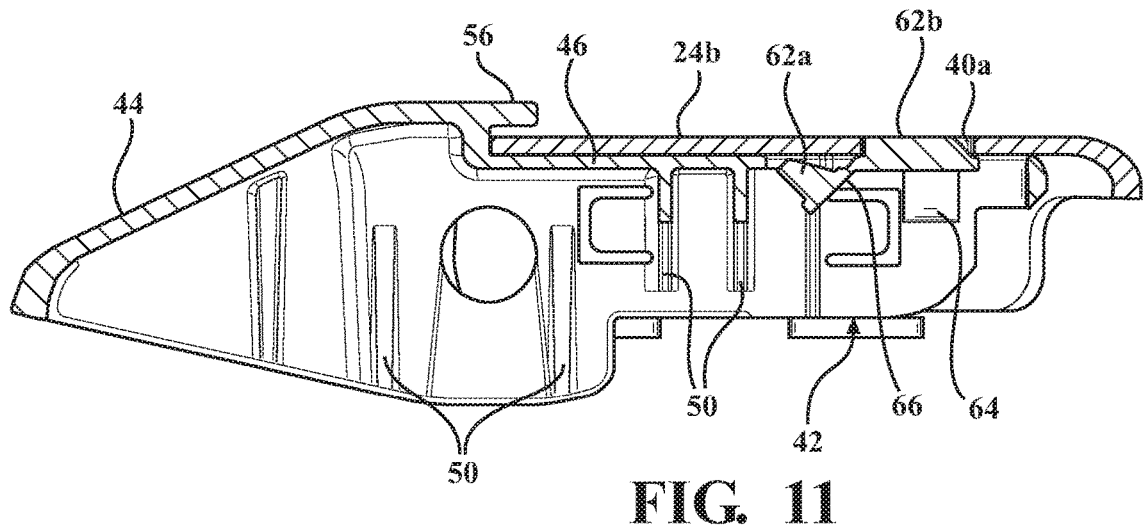
FIG. 11 is a cross-sectional view of FIG. 10.

The joint part 34 of the exemplary embodiment is made as a single, monolithic piece of injection molded plastic and is configured to directly attached with both of the 17 mm and 19 mm wiper arms 24a, 24b such that the windscreen wiper device 20 with this joint part 34 can be packaged and sold to customers whose cars have either of these wiper arms 24a, 24b. FIGS. 5-7 show the joint part 34 in connection with the 17 mm wiper arm 24a, and FIGS. 8-10 show the joint part 34 in connection with the 19 mm wiper arm 24b. As shown in these Figures, the 17 and 19 mm wiper arms 24a, 24b each are generally U-shaped, as viewed in cross-section, and have tops with rectangular apertures 40a, 40b formed therein. However, these wiper arms 24a, 24b have different features from one another and are not merely the same geometrical shape constructed to different scales.

The exemplary embodiment of the joint part 34 includes a main body portion 42 that extends in a longitudinal direction between opposite ends and a front nose portion 44 that is joined with one of the longitudinal ends. The main body portion 42 is generally U-shaped as viewed cross-section with a top wall 46 and a pair of side walls 48. The side walls 48 extend vertically downwardly from the top wall 46 and are spaced from one another in a lateral direction by an open space which opens downwardly. As shown in FIGS. 6 and 9, the main body portion 42 has a plurality of stiffening ribs 50 that are formed on the inner surfaces of the top wall 46 and the side walls 48 for strengthening the main body portion 42. The circular openings 38 of the joint part 34 are positioned on the side walls 48 of the main body portion 42 for receiving the protrusions 36 on the base 32 (shown in FIG. 1) to pivotally connect the joint part 34 with the base 32. In the longitudinal direction, the circular openings 38 are located adjacent the front nose portion 44.

Each of the side walls 48 of the main body portion 42 also includes a pair of spring fingers 52 that are spaced from one another and which protrude laterally outwardly from the side walls 48. When the joint part 34 is attached with either one of the 17 mm and 19 mm wiper arms 24a, 24b, the spring fingers 52 resiliently contact inner surfaces of the respective wiper arm 24a, 24b to prevent, or at least reduce, rattling between the joint part 34 and the wiper arm 24a, 24b. In the exemplary embodiment, the spring fingers 52 are located longitudinally between the circular openings 38 and a back longitudinal end of the main body portion 42, and on each side wall, one spring finger 52 is positioned closer to the respective circular opening 38 than to the longitudinal back end and the other spring finger 52 is positioned closer to the longitudinal back end than to the respective circular opening 38. Each of the side walls 48 also has a groove 54 which extends from a rear edge of the main body portion 42 forwardly past one of the spring fingers 52 for receiving a laterally extending protrusion (not shown) in the 17 mm wiper arm 24a. In a vertical direction, the grooves 54 are located between the spring fingers 52 and a lower edge of the main body portion 42.

Figure 2:
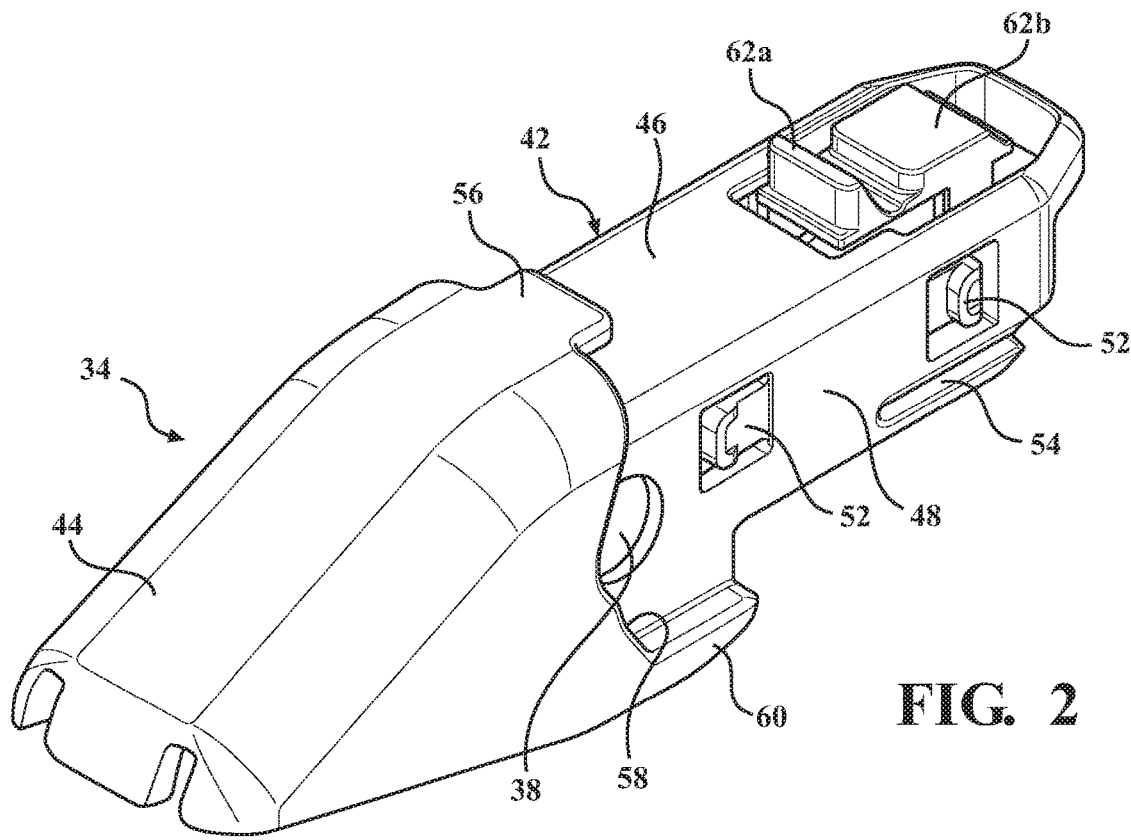
FIG. 2 is a perspective view of the joint part of FIG. 1.
Figure 3:
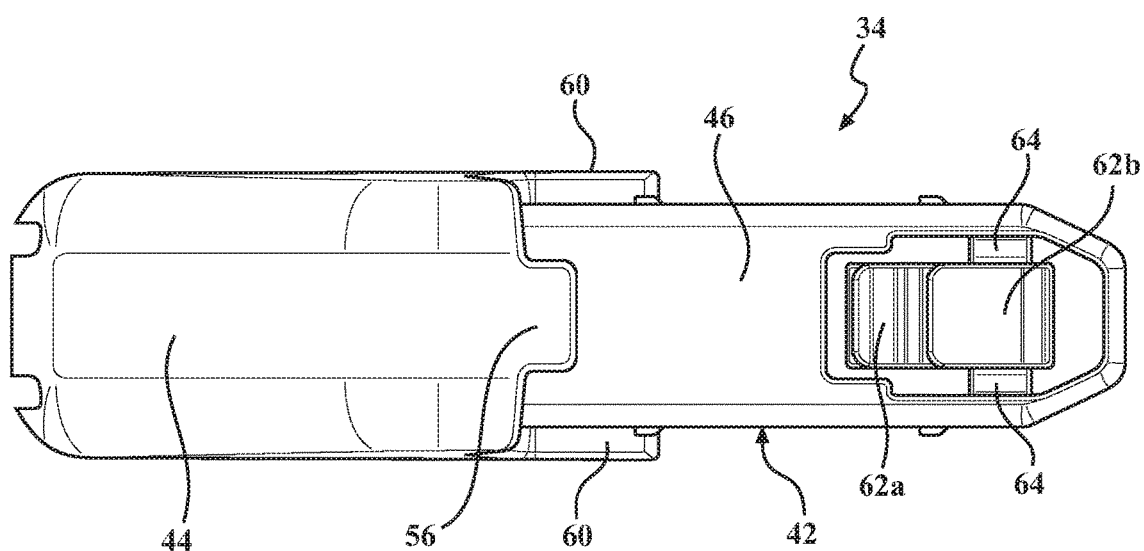
FIG. 3 is a top elevation view of the joint part of FIG. 2.

The front nose portion 44 has a greater width and a greater height than the main body portion 42. The front nose portion 44 has a tongue 56 which overlies and is spaced above the top wall 46 of the main body portion 42 for lockingly engaging a front top edge on each of the 17 and 19 mm wiper arms 24a, 24b, as shown in FIGS. 7 and 10. The front nose portion 44 also has a stop surface 58 which faces and surrounds the main body portion 42. As also shown in FIGS. 7 and 10, when the 17 and 19 mm wiper arms 24a, 24b are attached with the joint part 34, the front edge of the respective wiper arm 24a, 24b abut the stop surface 58 on the front nose portion 44. As shown in FIG. 2, the stop surface 58 is curved such that the circular openings 38 in the side walls 48 overlap, in the longitudinal direction, with parts of the stop surface 58 in the longitudinal direction.

The front nose portion 44 has a top surface which is planar adjacent the tongue 56 and then ramps downwardly towards a front longitudinal end of the joint part 34 such that, as viewed from the side, the front nose portion 44 is generally triangular in shape. The front nose portion 44 also has a bottom flange 60 which underlies a part of the main body portion 42 of the joint part 34. As shown in FIG. 7, when the 17 mm wiper arm 24a is attached with the joint part 34, a lower edge of the wiper arm 24a rests on top of the bottom flange 60. As shown in FIG. 2, the bottom flange 60 extends longitudinally past the circular openings 38 in the main body portion 42.

Figure 4:
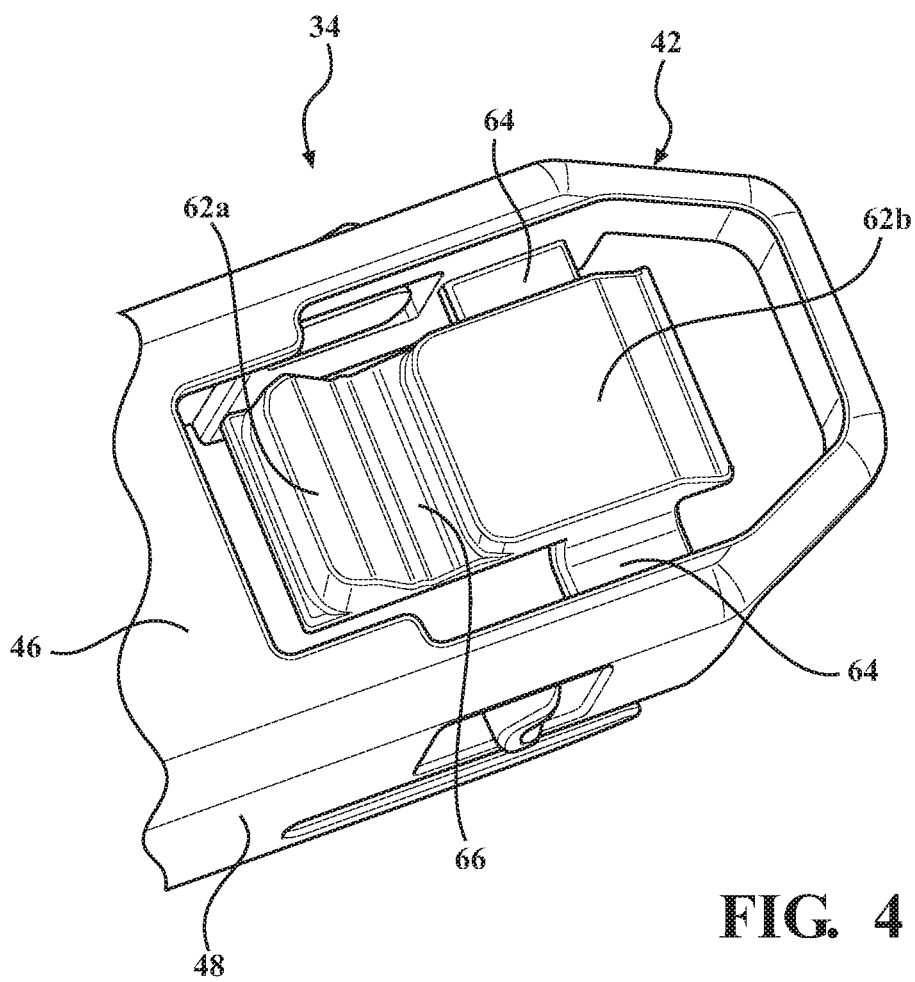
FIG. 4 is an enlarged view of a portion of the joint part of FIG. 2.
Figure 12:
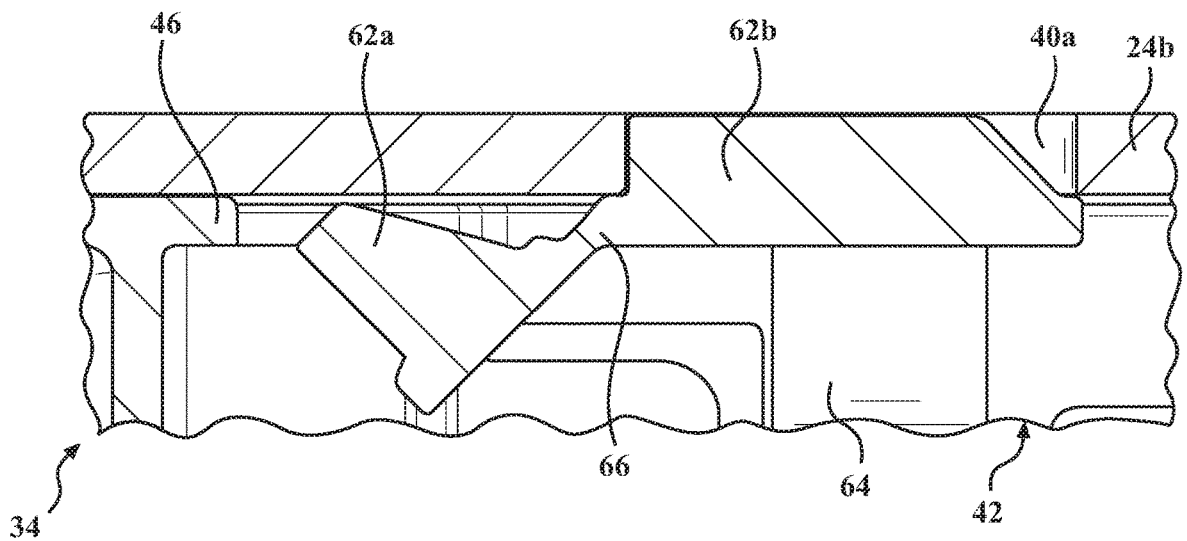
FIG. 12 is an enlarged view of a portion of FIG. 11.

Referring now to FIG. 4, the main body portion 42 of the joint part 34 has a T-shaped button configuration that is disposed in a window of the top wall 46. The T-shaped button configuration includes first and second buttons 62a, 62b which are spaced longitudinally from one another. As shown in FIG. 9, the first button 62a is shaped and positioned to lockingly engage with the aperture 40a in the top of the 17 mm wiper arm 24a, and as shown in FIG. 12, the second button 62b is shaped and positioned to lockingly engage with the aperture 40b in the top of the 19 mm wiper arm 24b. As shown in FIG. 2, in the longitudinal direction, the first and second buttons 62a, 62b are both entirely located closer to the back longitudinal end of the main body portion 42 than to the circular openings 38 of the side walls 48.

As shown in FIG. 4, the second button 62b is connected with both of the side walls 48 of the main body portion 42 via a pair of resilient strips 64. Each of the resilient strips 64 extends from a first end that is connected with a lower surface of the second button 62b to a second end that is connected with an inner surface of the respective side wall 48. The second end of each resilient strip 64 is spaced vertically below the top wall 46 of the main body portion 42, and each resilient strip 64 extends through the window such that, in a resting condition, both of the first and second buttons 62a, 62b are entirely located vertically above an upper surface of the top wall 46. As shown in FIG. 5, when the joint part 34 is in a resting condition, the first button 62a projects vertically above an upper surface of the second button 62b. Each of the resilient strips 64 is generally L-shaped with a short leg that extends in the lateral direction to the second end and a long leg that extends in the vertical direction to the first end. The short and long legs are connected with one another via a curved portion.

The first button 62a is connected with a leading edge of the second button 62b via a living hinge 66 which is resiliently deflectable to allow the first button 62a to be depressed relative to the second button 62b. The living hinge 66 serves as the only connection between the first button 62a and the rest of the joint part 34.

As shown in FIG. 5, each of the first and second buttons 62a, 62b has a longitudinally rearward facing ramp surface that is angled relative to the longitudinal direction. As shown in FIGS. 9 and 12, when the joint part 34 is attached with the 17 and 19 mm wiper arms 24a, 24b respectively, neither of the first and second buttons 62a, 62b fills the respective aperture 40a, 40b, and the ramped surfaces are entirely out of contact with the wiper arms 24a, 24b. However, a longitudinally forward facing side of each of the buttons 62a, 62b extends in a vertical and lateral plane to lockingly engage the respective wiper arm 24a, 24b by trapping a portion of the wiper arm 24a, 22b between the button 62a, 62b and the stop surface 58 of the front nose portion 44.

When the joint part 34 is attached with either of the 17 and 19 mm wiper arms 24a, 24b, a top front edge of the respective wiper arm 24a, 24b first contacts the ramped surface of the second button 62b. This causes the two resilient strips 64 that support the second button 62b to automatically deflect resiliently (i.e., elastically or in a spring-like manner) such that the second button 62b is urged downwardly to allow the front edge of the wiper arm 24a, 24b to pass the second button 62b. The top front edge of the wiper arm 24a, 24b then encounters the first button 62a, which raises above the second button 62b. Continued urging of the joint part 34 onto the wiper arm 24a, 24b causes the first button 62a to pivot vertically downwardly at the living hinge 66, which connects the first and second buttons 62a, 62b, to allow the top front edge of the wiper arm 24a, 24b to pass the first button 62a. When the front edge of the wiper arm 24a, 24b encounters the stop surface 58 of the front nose portion 44, depending on whether the wiper arm is a 17 mm wiper arm 24a or a 19 mm wiper arm 24b, either the living hinge 66 or the resilient strips 64 will snap the first or second button 62a, 62b upwardly into the aperture 40a, 40b of the wiper arm 24a, 24b, thereby locking the joint part 34 with the wiper arm 24a, 24b.

Either of the 17 and 19 mm wiper arms 24a, 24b can be detached from the joint part 34 by pressing the one of the buttons 62a, 62b in the aperture 40a, 40b of the respective wiper arm 24a, 24b. In the case of the 17 mm wiper arm 24a, pressing the first button 62a causes the first button 62a to rotate downwardly about the living hinge 66 to disengage the front button 62a from the aperture 40a in the wiper arm 24a. In the case of the 19 mm wiper arm 24b pressing the second button 62b causes the resilient strips 64 to buckle elastically, to disengage the second button 62b from the aperture 40b in the wiper arm 24b. In either case, the joint part 34 can then be slid out of the wiper arm 24b.

From a user perspective, the processes of attaching and detaching either of the 17 and 19 mm wiper arms 24a, 24b are basically equivalent and are very simple. To attach the joint part 34, the user simply slides the joint part 34 onto his or her wiper arm 24a, 24b until he or she hears one of the buttons 62a, 62b snap into the opening 40a, 40b of his or her wiper arm 24a, 24b. To detach the joint part 34, the user simply presses the only visible button 62a, 62b and slides the joint part 34 out of his or her wiper arm 24a, 24b.

Obviously, many modifications and variations of the present invention are possible in light of the above teachings and may be practiced otherwise than as specifically described while within the scope of the appended claims. Additionally, it is to be understood that all features of all claims and all embodiments can be combined with each other, as long as they do not contradict each other.

What is claimed is:
1. A windscreen wiper device, comprising:
a wiper element made of an elastomeric material;
at least one carrier element operably supporting said wiper element;

a connecting device including a base that is fixedly attached with said at least one carrier element and including a joint part that is attached with said base such that said joint part can pivot about a pivot axis;

said joint part having a top wall that extends in a lateral direction between a pair of side walls;

said joint part including a button configuration for lockingly attaching said connecting device with at least two different types of oscillating wiper arms;

said button configuration including a first button and a pair of resilient strips which extend from said side walls to said button, said resilient strips biasing said first button into a raised position with said first button projecting above said top wall, and said resilient strips allowing said first button to move to a pressed position wherein a top surface of said first button is generally flush with said top wall; and said button configuration including a second button that is attached with said first button via a living hinge and wherein said second button is pivotable about said living hinge from a first position wherein said second button projects above said top wall to a second position wherein said second button is recessed below said first button.

2. The windscreen wiper device as set forth in claim 1 wherein when said first button is in said raised position and said second button is in said first position, said second button projects above said first button.

3. The windscreen wiper device as set forth in claim 1 wherein each of said resilient strips is fixedly attached with a respective one of said side walls at a location that is spaced below said top wall.

4. The windscreen wiper device as set forth in claim 1 wherein each of said first and second buttons has a ramped surface which faces in a longitudinal direction away from said pivot axis.

5. The windscreen wiper device as set forth in claim 4 wherein, in said longitudinal direction, said second button is located between said first button and said pivot axis.

6. The windscreen wiper device as set forth in claim 1 wherein said top wall of said joint part has a window and wherein said first and second buttons are located in said window.

7. The windscreen wiper device as set forth in claim 1 wherein said joint part includes a main body portion and a front nose portion that is positioned at one longitudinal end of said main body portion.

8. The windscreen wiper device as set forth in claim 7 wherein said front nose portion has a tongue which overlies said top wall.

9. The windscreen wiper device as set forth in claim 7 wherein said front nose portion has a greater width and a greater height than said main body portion.

10. The windscreen wiper device as set forth in claim 1 wherein said joint part includes spring fingers that protrude laterally outwardly from said side walls.

11. The windscreen wiper device as set forth in claim 1 wherein said base includes a pair of laterally outwardly extending and co-axially aligned protrusions and wherein said side walls of said joint part includes a pair of circular openings which receive said protrusions to connect said joint part with said base.

12. The windscreen wiper device as set forth in claim 11 wherein said first and second buttons are located in a longitudinal direction closer to one longitudinal end of said joint part than to said circular openings.

* * * * *